(12) United States Patent
Iwai et al.

(10) Patent No.: US 11,240,806 B2
(45) Date of Patent: *Feb. 1, 2022

(54) INTEGRATED CIRCUIT, APPARATUS AND METHOD FOR COMMUNICATION USING RESOURCE BLOCK GROUPS

(71) Applicant: Sun Patent Trust, New York, NY (US)

(72) Inventors: Takashi Iwai, Ishikawa (JP); Sadaki Futagi, Ishikawa (JP); Daichi Imamura, Kanagawa (JP); Akihiko Nishio, Osaka (JP); Seigo Nakao, Osaka (JP); Yoshihiko Ogawa, Kanagawa (JP)

(73) Assignee: Sun Patent Trust, New York, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/717,344

(22) Filed: Dec. 17, 2019

(65) Prior Publication Data

US 2020/0128545 A1 Apr. 23, 2020

Related U.S. Application Data

(63) Continuation of application No. 15/857,465, filed on Dec. 28, 2017, now Pat. No. 10,568,099, which is a
(Continued)

(30) Foreign Application Priority Data

Feb. 18, 2009 (JP) ................................. 2009-035617

(51) Int. Cl.
*H04W 72/04* (2009.01)
*H04L 5/00* (2006.01)
*H04W 72/08* (2009.01)

(52) U.S. Cl.
CPC ....... *H04W 72/0453* (2013.01); *H04L 5/0037* (2013.01); *H04L 5/0041* (2013.01);
(Continued)

(58) Field of Classification Search
None
See application file for complete search history.

(56) References Cited

U.S. PATENT DOCUMENTS 8,134,966 B2   3/2012 Nagata et al.
9,112,651 B2   8/2015 Iwai et al.
(Continued)

FOREIGN PATENT DOCUMENTS

CN   101127719 A   2/2008
JP   2008-053858 A   3/2008
(Continued)

OTHER PUBLICATIONS

3rd Generation Partnership Project; Technical Specification Group Radio Access Network; Evolved Universal Terrestrial Radio Access (E-UTRA); Physical Layer Procedures, 3GPP TS 36.213 V8.1.0 Nov. 2007 (Year: 2007).*
(Continued)

*Primary Examiner* — Jamaal Henson
(74) *Attorney, Agent, or Firm* — Seed IP Law Group LLP

(57) ABSTRACT

A scheduling apparatus and a scheduling method, wherein the amount of signaling for frequency resource allocation information can be reduced while maintaining system throughput performance. In a base station apparatus, a scheduling section allocates frequency resources to frequency allocation target terminals based on set frequency allocation units, and a frequency allocation parameter setting section adjusts the set frequency allocation units set in the scheduling section based on cluster numbers. Due to this, in each cluster number, frequency resources can be allocated
(Continued)

based on the most suitable frequency allocation units with respect to the signaling bit number. As a result, the amount of signaling for frequency resource allocation information can be reduced. Further, system throughput can be maintained by making the cluster number, which is a parameter having little effect on system throughput, a setting parameter for frequency allocation units.

20 Claims, 17 Drawing Sheets

Related U.S. Application Data continuation of application No. 15/498,036, filed on Apr. 26, 2017, now Pat. No. 9,888,477, which is a continuation of application No. 15/214,134, filed on Jul. 19, 2016, now Pat. No. 9,667,393, which is a continuation of application No. 14/799,316, filed on Jul. 14, 2015, now Pat. No. 9,397,803, which is a continuation of application No. 13/201,767, filed as application No. PCT/JP2010/001008 on Feb. 17, 2010, now Pat. No. 9,112,651.

(52) U.S. Cl.
CPC ......... *H04L 5/0064* (2013.01); *H04W 72/042* (2013.01); *H04W 72/0406* (2013.01); *H04W 72/0413* (2013.01); *H04W 72/08* (2013.01); *H04L 5/006* (2013.01); *H04L 5/0091* (2013.01)

(56) References Cited

U.S. PATENT DOCUMENTS

| | | |
|---|---|---|
| 2005/0037764 A1 | 2/2005 | Trachtman |
| 2009/0069023 A1 | 3/2009 | Ahn et al. |
| 2009/0325585 A1 | 12/2009 | Farajidana et al. |
| 2010/0067479 A1 | 3/2010 | Choi et al. |
| 2010/0142455 A1 | 6/2010 | Imamura |
| 2010/0157913 A1 | 6/2010 | Nagata et al. |
| 2010/0195604 A1* | 8/2010 | Papasakellariou .... H04L 5/0012 370/329 |
| 2010/0290405 A1 | 11/2010 | Arnott et al. |
| 2011/0110322 A1 | 5/2011 | Koyanagi et al. |
| 2011/0255485 A1 | 10/2011 | Chen et al. |

FOREIGN PATENT DOCUMENTS

| | | |
|---|---|---|
| WO | 2008/054157 A2 | 5/2008 |
| WO | 2009/154270 A1 | 12/2009 |

OTHER PUBLICATIONS

3GPP TS 36.211 V8.5.0, "3rd Generation Partnership Project; Technical Specification Group Radio Access Network; Evolved Universal Terrestrial Radio Access (E-UTRA); Physical Channels and Modulation (Release 8)," Dec. 2008, 82 pages.
3GPP TS 36.212 V8.3.0, "3rd Generation Partnership Project; Technical Specification Group Radio Access Network; Evolved Universal Terrestrial Radio Access (E-UTRA); Multiplexing and channel coding {Release 8)," May 2008, pp. 1-48.
3GPP TS 36.213 V8.5.0, "3rd Generation Partnership Project; Technical Specification Group Radio Access Network; Evolved Universal Terrestrial Radio Access (E-UTRA); Physical layer procedures (Release 8)," Dec. 2008, 76 pages.
3GPP TSG RAN1 #54bis, "Uplink Access for L TE-A—Non-aggregated and Aggregated Scenarios," Motorola, R1-083820, Sep. 29-Oct. 3, 2008, pp. 1-6.
3GPP TSG RAN1 #56, "DCI for uplink non-contiguous RB allocations," Motorola, R1-090802, Feb. 9-13, 2009, pp. 1-5.
3GPP TSG-RAN WG1 #49-bis, "Impact of Constrained Resource Signaling in PDCCH," Qualcomm Europe, R1-072750, Jun. 25-29, 2007, pp. 1-9.
3GPP TSG RAN WG1 Meeting #55, "Comparison between Clustered DFT-s-OFDM and OFDM for supporting non-contiguous RB allocation within a component carrier," Panasonic, R1-084583, Nov. 10-14, 2008, pp. 1-7.
"$3^{rd}$ Generation Partnership Project; Technical Specification Group Radio Access Network; Evolved Universal Terrestrial Radio Access (E-UTRA); Physical layer procedures (Release 8)," 3GPP TS 36.213 v8.1.0, Nov. 2007, 17 pages.
Extended European Search Report, dated Oct. 6, 2015, for corresponding EP Application No. 10743560.4-1851 / 2400807, 12 pages.
International Search Report, dated Apr. 20, 2010, for International Application No. PCT/JP2010/001008, 2 pages.
LG Electronics, "Uplink multiple access schemes for LTE-A," R1-083658, 3GPP TSG RAN WG1 #54bis, Agenda Item: 11, Prague, Czech, Sep. 29-Oct. 3, 2008, 12 pages.
Nokia Siemens Networks, Nokia, "Uplink Multiple access for LTE-Advanced," R1-082609, RAN WG1 Meeting #53bis, Agenda Item: 12, Warsaw, Poland, Jun. 30-Jul. 4, 2008, 12 pages.
NEC Group, NTT DoCoMo, "Uplink Resource Allocation for E-UTRA," R1-062773, TSG-RAN WG1 #46bis, Agenda Item: 6.12.2, Seoul, Korea, Aug. 9-Oct. 13, 2009, 10 pages.
Panasonic, "System performance of uplink non-contigous resource allocation," R1-090257, 3GPP TSG RAN WG1 Meeting #55bis, Agenda Item: 12.1, Ljubljana, Jan. 12-16, 2009, 7 pages.
Qualcomm Europe, "System Performance Comparisons of: SC-FDM, Clustered DFT-S OFDM, and OFDM," R1-090361, 3GPP TSG RAN WG1 #55bis, Agenda Item: 12.1, Ljubljana, Slovenia, Jan. 12-16, 2009, 10 pages.
"Resource allocation type modification to reduce PDCCH overhead," 3GPP TSG RAN WG1 Meeting #52bis, Mar. 31-Apr. 4, 2008, R1-081317, 3 pages.
Texas Instruments, "Remaining Details for SU-MIMO for E-UTRA," R1-073845, 3GPP TSG RAN WG1 50, Agenda Item: 7.2.6, Athens, Greece, Aug. 20-24, 2007, 6 pages.
TSG-RAN WG1 #51, "DL Unicast Resource Allocation Signalling using L 1 L2 control channels," R1-075055, NEC Group, Nov. 5-9, 2007, pp. 1-4.

\* cited by examiner

| NUMBER OF CLUSTERS | FREQUENCY ASSIGNMENT UNIT [RB] | AMOUNT OF SIGNALING | | |
|---|---|---|---|---|
| | | NUMBER OF CLUSTERS [bits] | FREQUENCY ASSIGNMENT INFORMATION [bits] | TOTAL [bits] |
| 2 | 2 | 2 | 18 | 20 |
| 3 | 4 | 2 | 18 | 20 |
| 4 | 5 | 2 | 18 | 20 |

FIG.5

| NUMBER OF CLUSTERS | FREQUENCY ASSIGNMENT UNIT [RB] | AMOUNT OF SIGNALING | | |
| --- | --- | --- | --- | --- |
| | | NUMBER OF CLUSTERS [bits] | FREQUENCY ASSIGNMENT INFORMATION [bits] | PADDING BIT [bits] | TOTAL [bits] |
| 2 | 1 | 2 | 22 | 0 | 24 |
| 3 | 3 | 2 | 21 | 1 | 24 |
| 4 | 4 | 2 | 21 | 1 | 24 |

FIG.8

| NUMBER OF CLUSTERS | FREQUENCY ASSIGNMENT UNIT [RB] | AMOUNT OF SIGNALING | | |
|---|---|---|---|---|
| | | NUMBER OF CLUSTERS [bits] | FREQUENCY ASSIGNMENT INFORMATION [bits] | PADDING BIT [bits] | TOTAL [bits] |
| 2 | 1 | 3 | 26 | 8 | 37 |
| 3 | 2 | 3 | 31 | 3 | 37 |
| 4 | 3 | 3 | 33 | 1 | 37 |
| 5 | 4 | 3 | 34 | 0 | 37 |
| 6 | 5 | 3 | 33 | 1 | 37 |

FIG.10

| NUMBER OF CLUSTERS | FREQUENCY ASSIGNMENT UNIT [RB] | AMOUNT OF SIGNALING | | |
|---|---|---|---|---|
| | | NUMBER OF CLUSTERS [bits] | FREQUENCY ASSIGNMENT INFORMATION [bits] | RB OFFSET [bits] | TOTAL [bits] |
| 2 | 1 | 2 | 22 | 0 | 24 |
| 3 | 3 | 2 | 21 | 1 | 24 |
| 4 | 4 | 2 | 21 | 1 | 24 |

FIG.14

| NUMBER OF CLUSTERS | FREQUENCY ASSIGNMENT UNIT [RB] | SIGNALING METHOD | AMOUNT OF SIGNALING | | | |
|---|---|---|---|---|---|---|
| | | | NUMBER OF CLUSTERS [bits] | FREQUENCY ASSIGNMENT INFORMATION [bits] | PADDING BIT [bits] | TOTAL [bits] |
| 2 | 1 | SOLVING METHOD | 2 | 22 | 3 | 27 |
| 3 | 2 | SOLVING METHOD | 2 | 25 | 0 | 27 |
| 4 | 3 | SOLVING METHOD | 2 | 25 | 0 | 27 |
| 5 OR GREATER | 4 | CONVENTIONAL METHOD | 2 | 25 | 0 | 27 |

FIG.15

| NUMBER OF CLUSTERS | FREQUENCY ASSIGNMENT UNIT [RB] | AMOUNT OF SIGNALING | | |
|---|---|---|---|---|
| | | NUMBER OF CLUSTERS + FREQUENCY ASSIGNMENT INFORMATION [bits] | OFFSET INFORMATION [bits] | TOTAL [bits] |
| 2 | 1 | 24 | 0 | 24 |
| 3 | 3 | 22 | 2 | 24 |
| 4 | 4 | 23 | 1 | 24 |

FIG.16

| NUMBER OF CLUSTERS | FERQUENCY ASSIGNMENT UNIT [RB] | AMOUNT OF SIGNALING | | |
|---|---|---|---|---|
| | | NUMBER OF CLUSTERS [bits] | FREQUENCY ASSIGNMENT INFORMATION [bits] | PADDING BIT [bits] | TOTAL [bits] |
| 1 | 1 | 2 | 13 | 9 | 24 |
| 2 | 1 | 2 | 22 | 0 | 24 |
| 3 | 3 | 2 | 21 | 1 | 24 |
| 4 | 4 | 2 | 21 | 1 | 24 |

FIG.17

INTEGRATED CIRCUIT, APPARATUS AND METHOD FOR COMMUNICATION USING RESOURCE BLOCK GROUPS

BACKGROUND

Technical Field

The present disclosure relates to a scheduling apparatus and a scheduling method.

Description of the Related Art

For an uplink channel of 3rd generation partnership project long term evolution (3GPP LTE), a data signal of each terminal is assigned to contiguous frequency bands to reduce the cubic metric (CM) and the peak-to-average power ratio (PAPR). Transmission using these contiguous frequency bands may be called "contiguous frequency transmission."

A terminal transmits data according to a frequency resource assignment information reported by a base station. Frequency resource assignment information for contiguous frequency transmission involves two information about a start position and an end position (or a bandwidth from a start position) in a transmission band. Therefore, when the system bandwidth is expressed as NRB [RB], the number of signaling bits of frequency resource assignment information can be represented by equation 1 below. That is, because the number of candidates for a start position and an end position in a transmission band can be expressed as $N_{RB}$ (the numbers of both ends and borders between adjacent two RBs in a frequency band)+1, signaling bits are required for the numbers of combinations to select two candidates for a start position and an end position in the frequency band out of the number of candidates $N_{RB}$+1, in equation 1.

[1]

$$\text{The number of signaling bits} = \lceil \log_2(_{N_{RB}+1}C_2) \rceil \text{ [bits]} \quad \text{(Equation 1)}$$

where a resource block (RB) is a unit for assigning frequency to data. One RB is formed with 12 subcarriers. When NRB=100 [RB] is satisfied, the number of signaling bits is 13 [bits].

For an uplink channel of LTE-Advanced, which is an evolved version of 3rd generation partnership project long-term evolution (3GPP LTE), using "non-contiguous frequency transmission" in addition to contiguous frequency transmission is under consideration to improve the sector throughput performance (see Non-Patent Literature 1).

Non-contiguous frequency transmission is a method of transmitting a data signal and a reference signal by assigning such signals to non-contiguous frequency bands, which are dispersed in a wide range of band. As shown in FIG. 1, in non-contiguous frequency transmission, it is possible to assign a data signal and a reference signal to discrete frequency bands. Therefore, in non-contiguous frequency transmission, compared to contiguous frequency transmission, the flexibility in assigning a data signal and a reference signal to frequency bands in each terminal increases. By this means, it is possible to gain greater frequency scheduling effects.

Here, as a method of reporting frequency resource assignment information for non-contiguous frequency transmission, there is a method of reporting whether or not to perform assignment for each RB in the system band, using a bitmap (see Non-Patent Literature 2). As shown in FIG. 2, a base station reports whether or not to assign the resource per predetermined frequency assignment unit [RB] (per 4 [RB] in FIG. 2), using one bit. That is, a base station reports to a terminal to which frequency is assigned, a frequency assigning bit sequence that is obtained by assigning the bit value of 1 to the former and assigning the bit value of 0 to the latter of the assignment sub-band that is assigned to a terminal to which frequency is assigned and the non-assignment sub-band that is not assigned, in a plurality of sub-bands that are formed by dividing the system band per frequency assignment unit [RB]. In FIG. 2, the frequency assignment unit to which bit "1" is assigned is a frequency area that is assigned to a terminal to be assigned while the frequency assignment unit to which bit "0" is assigned is a frequency area that is not assigned to the terminal to be assigned. Therefore, when expressing a system bandwidth as $N_{RB}$ [RB] and a frequency assignment unit as P [RB], the number of signaling bits required for the frequency resource assignment information of this method can be represented by equation 2 below.

[2]

$$\text{The number of signaling bits} = \lceil N_{RB}/P \rceil \text{ [bits]} \quad \text{(Equation 2)}$$

CITATION LIST

Non-Patent Literature

NPL 1
3GPP R1-090257, Panasonic, "System performance of uplink non-contiguous resource allocation"
NPL 2
3GPP TS36.212 V8.3.0. 5.3.3.1.2 DCI format 1 type 0, "E-UTRA Multiplexing and channel coding (Release 8)"
NPL 3
3GPP R1-084583, Panasonic, "Comparison between Clustered DFT-s-OFDM and OFDM for supporting non-contiguous RB allocation within a component carrier"

BRIEF SUMMARY

Technical Problem

However, non-contiguous frequency transmission has a problem that the number of signaling bits required to report frequency resource assignment information increases compared to contiguous frequency transmission. For example, when $N_{RB}$=100 [RB] and P=4 [RB] are satisfied, the number of signaling bits is 25 [bits]. Although it is possible to make an RB assignment unit (P) larger to reduce the number of signaling bits, if the RB assignment unit is simply made larger, flexibility of frequency scheduling decreases, consequently damaging the system throughput.

It is therefore an object of the present disclosure to provide a scheduling apparatus and a scheduling method for making it possible to maintain system throughput performance and reduce the amount of signaling for frequency resource assignment information.

Solution to Problem

A scheduling apparatus according to the present disclosure employs a configuration to have a frequency assignment setting section that sets a frequency assignment unit based on the number of clusters to apply to a terminal to which frequency is assigned; and a scheduler that assigns a frequency resource to the terminal to which frequency is assigned, based on the set frequency assignment unit.

A scheduling method according to the present disclosure employs a configuration to set a frequency assignment unit based on the number of clusters to apply to a terminal to which frequency is assigned; and assign a frequency resource to the terminal to which frequency is assigned based on the set frequency assignment unit.

Advantageous Effects of Invention

According to the present disclosure, it is possible to provide a scheduling apparatus and a scheduling method for making it possible to maintain system throughput performance and reduce the amount of signaling for frequency resource assignment information.

BRIEF DESCRIPTION OF THE SEVERAL VIEWS OF THE DRAWINGS

FIG. 5 shows an example of a table showing correspondence of a plurality of numbers of clusters and frequency assignment units corresponding to each number of clusters;

FIG. 8 shows an example of a table showing correspondence of a plurality of numbers of clusters and frequency assignment units corresponding to each number of clusters;

FIG. 10 shows an example of a table showing correspondence of a plurality of numbers of clusters and frequency assignment units corresponding to each number of clusters;

FIG. 14 shows an example of a table showing correspondence of a plurality of numbers of clusters and frequency assignment units corresponding to each number of clusters;

FIG. 15 shows an example of a table showing correspondence of a plurality of numbers of clusters and frequency assignment units corresponding to each number of clusters;

FIG. 16 shows an example of a table showing correspondence of a plurality of numbers of clusters and frequency assignment units corresponding to each number of clusters; and FIG. 17 shows an example of a table showing correspondence of a plurality of numbers of clusters and frequency assignment units corresponding to each number of clusters.

DETAILED DESCRIPTION

Figure 1:
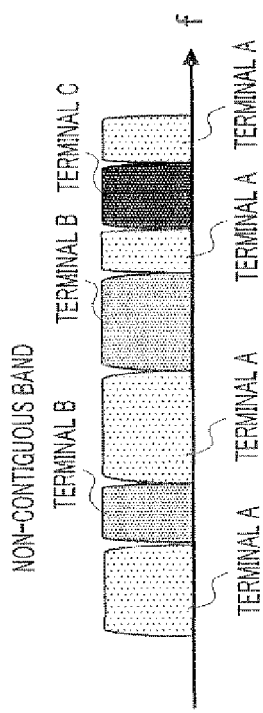
FIG. 1 shows non-contiguous frequency transmission.
Figure 1:
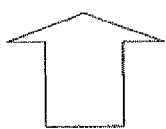
Figure 1:
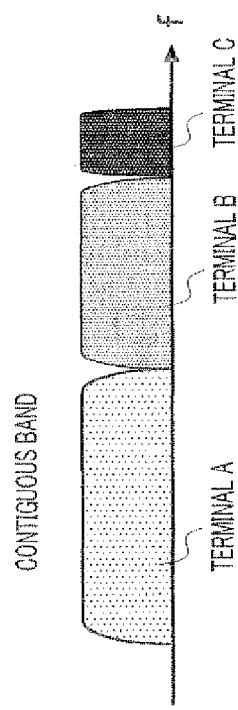
Figure 2:
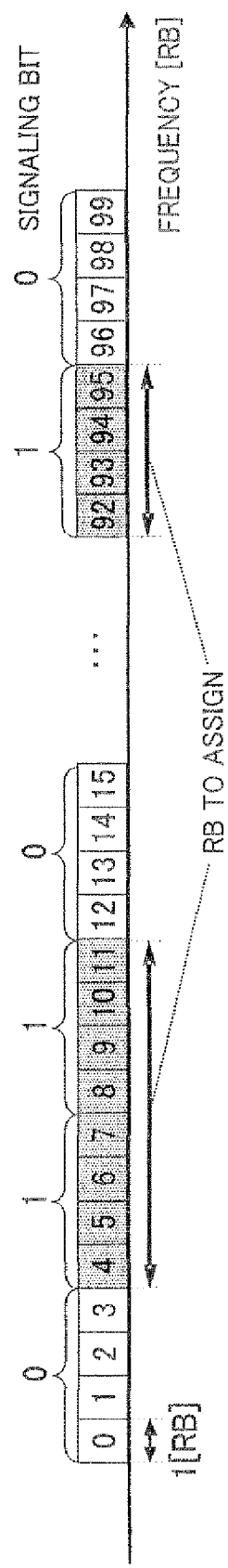
FIG. 2 shows a method of reporting frequency resource assignment information for non-contiguous frequency transmission.

Now, embodiments of the present disclosure will be described in detail with reference to the accompanying drawings. In embodiments, the same parts will be assigned the same reference numerals and overlapping explanations will be omitted.

Embodiment 1

Figure 3:
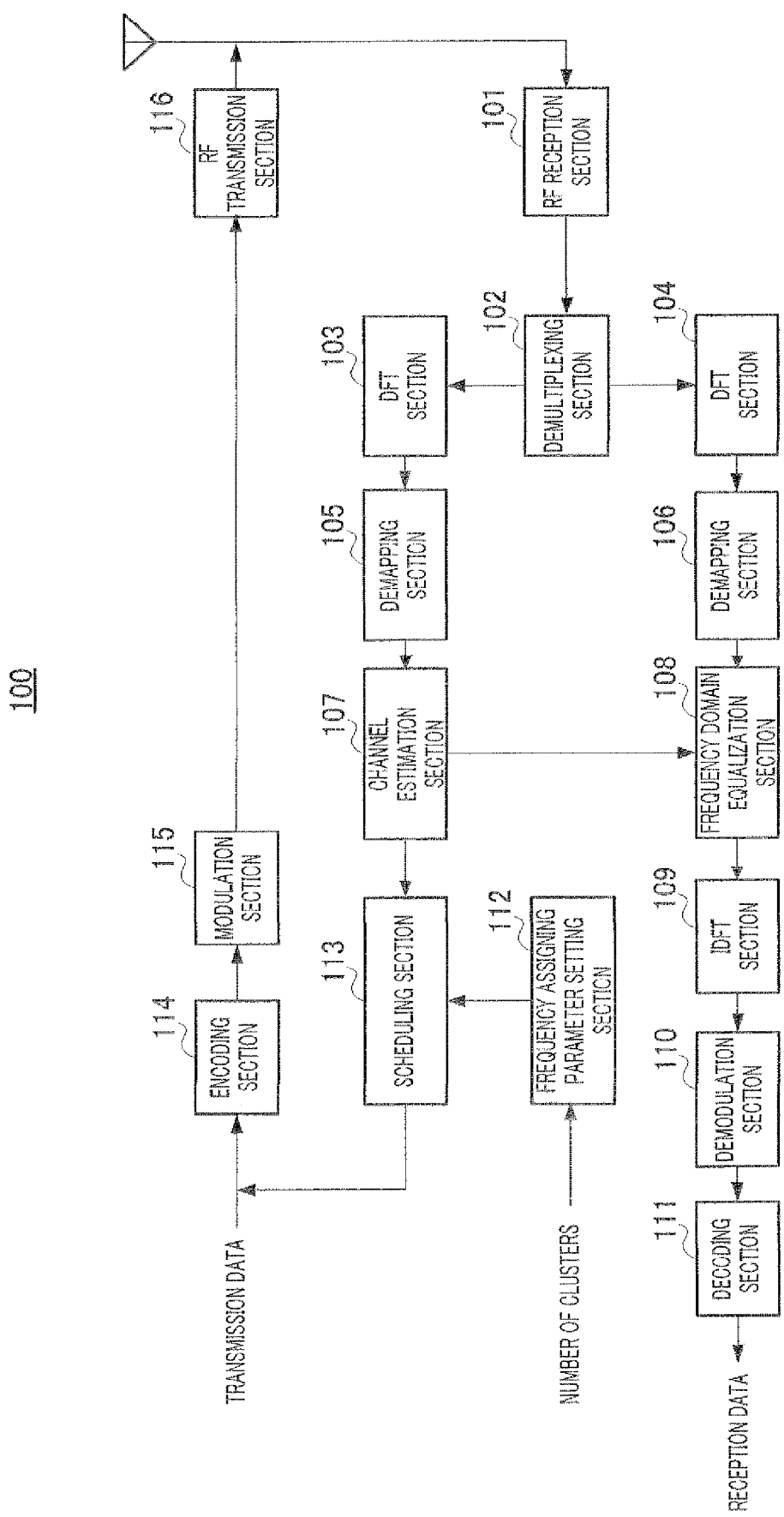
FIG. 3 is a block diagram showing a configuration of a base station apparatus according to Embodiment 1 of the present invention.

FIG. 3 is a block diagram showing a configuration of base station apparatus 100 according to Embodiment 1 of the present disclosure. In FIG. 3, base station apparatus 100 is provided with RF reception section 101, demultiplexing section 102, DFT sections 103 and 104, demapping sections 105 and 106, channel estimation section 107, frequency domain equalization section 108, IDFT section 109, demodulation section 110, decoding section 111, frequency assigning parameter setting section 112, scheduling section 113, encoding section 114, modulation section 115, and RF transmission section 116.

RF reception section 101 performs reception processing, such as down-conversion and A/D conversion, on a signal received from terminal apparatus 200 (described later) via an antenna, and outputs the reception-processed signal to demultiplexing section 102.

Demultiplexing section 102 demultiplexes the signal input from RF reception section 101 to a pilot signal and a data signal. Then, demultiplexing section 102 outputs the pilot signal to DFT section 103 and outputs the data signal to DFT section 104.

DFT section 103 performs DFT processing on the pilot signal received from demultiplexing section 102 to convert a time domain signal into a frequency domain signal. Then, DFT section 103 outputs the pilot signal converted into a frequency domain to demapping section 105.

Demapping section 105 extracts a pilot signal corresponding to the transmission band of terminal apparatus 200 (described later) from the frequency-domain pilot signal received from DFT section 103, and outputs the pilot signal to channel estimation section 107.

Channel estimation section 107 estimates frequency variation in a channel (i.e., channel frequency response) and reception quality per frequency band by performing correlation calculation on the reception pilot signal received from demapping section 105 and the transmission pilot signal that is known between base station apparatus 100 and terminal apparatus 200. Then, channel estimation section 107 outputs a channel estimation value, which is a result of this estimation, to frequency domain equalization section 108 and scheduling section 113.

DFT section 104 performs DFT processing on the data signal received from demulpexing section 102 to convert a time domain signal into a frequency domain signal. Then, DFT section 104 outputs the data signal converted into a frequency domain to demapping section 106.

Demapping section 106 extracts part of the data signal corresponding to the transmission band of terminal apparatus 200 from the signal received from DFT section 104, and outputs the data signal to frequency domain equalization section 108.

Frequency domain equalization section 108 performs equalization processing on the data signal received from demapping section 106 using the channel estimation value (i.e., channel frequency response) received from channel estimation section 107. Then, frequency domain equalization section 108 outputs the signal obtained by equalization processing to IDFT section 109.

IDFT section 109 performs IDFT processing on the data signal input from frequency domain equalization section 108. Then, IDFT section 109 outputs the signal obtained by IDFT processing to demodulation section 110.

Demodulation section 110 performs demodulation processing on the signal received from IDFT section 109 and outputs the signal obtained by modulation processing to decoding section 111.

Decoding section 111 performs decoding processing on the signal received from demodulation section 110, and extracts the reception data.

Frequency assigning parameter setting section 112 maintains information about the relationship between the number of clusters and the frequency assignment unit that are applied to a terminal to which frequency is assigned. Frequency assigning parameter setting section 112, for example, maintains a table showing correspondence of a plurality of numbers of clusters and frequency assignment units corresponding to each number of clusters. Then, frequency assigning parameter setting section 112 sets a frequency assignment unit corresponding to the number of clusters indicated by the input information about the number of clusters, to scheduling section 113. This setting processing on a frequency assignment unit basis is performed for each terminal to which frequency is assigned. That is, frequency assigning parameter setting section 112 adjusts a frequency assignment unit to be set to scheduling section 113 based on the number of clusters to apply to a terminal to which frequency is assigned.

Here, a frequency assignment unit varies depending on the number of clusters. Further, an upper limit value is determined for the number of clusters to apply to a terminal to which frequency is assigned. In this regard, the relationship between the number of clusters and the frequency assignment unit that are applied to a terminal to which frequency is assigned is determined in advance for each base station apparatus 100 or the whole system. This relationship will be described in detail later.

Scheduling section 113 assigns a frequency resource to a terminal to which frequency is assigned, based on the frequency assignment unit set by frequency assigning parameter setting section 112. Specifically, scheduling section 113 performs frequency scheduling for an arbitrary terminal to which frequency is assigned, based on the reception quality information, in each sub-band of a predetermined transmission band, about a signal transmitted in the predetermined transmission band from the arbitrary terminal to which frequency is assigned, which is received from channel estimation section 107, and the frequency assignment unit that is received from frequency assigning parameter setting section 112 and is applied to the arbitrary terminal to which frequency is assigned. Reporting of frequency scheduling information is performed, as described above, by a frequency assigning bit sequence corresponding to an arrangement pattern of the assignment sub-band that is assigned to a terminal to which frequency is assigned and the non-assignment sub-band that is not assigned, in a plurality of sub-bands that are formed by dividing the system band per frequency assignment unit.

Encoding section 114 encodes transmission data including the frequency scheduling information for a terminal to which frequency is assigned, and outputs the encoded data to modulation section 115.

Modulation section 115 modulates the encoded data received from encoding section 114 and outputs the modulated signal to RF transmission section 116.

RF transmission section 116 performs transmission processing, such as D/A conversion, up-conversion, and amplification, on the modulated signal received from modulation section 115, and transmits the obtained radio signal to terminal apparatus 200 via the antenna.

Figure 4:
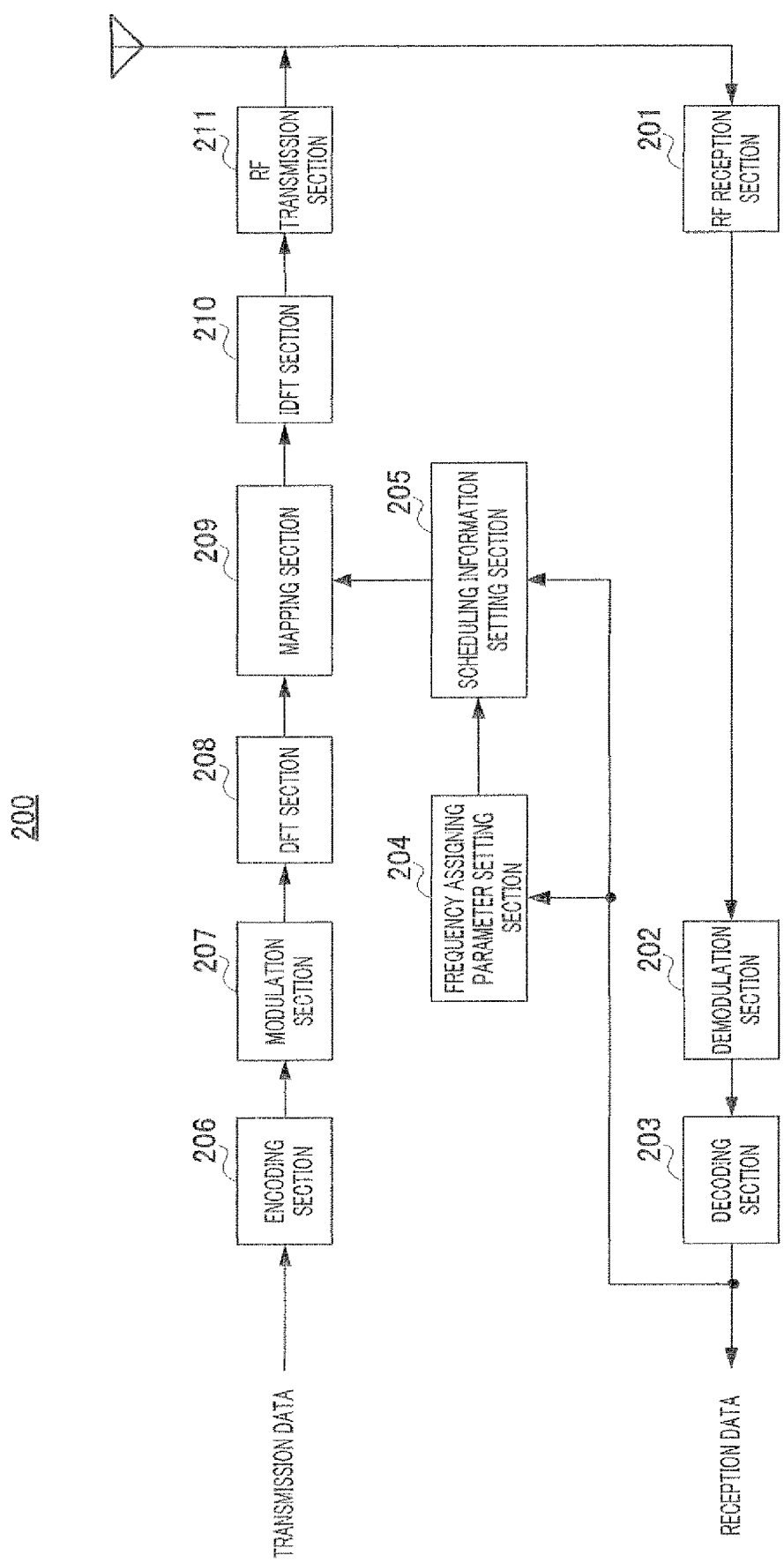
FIG. 4 is a block diagram showing a configuration of a terminal apparatus according to Embodiment 1 of the present invention.

FIG. 4 is a block diagram showing a configuration of terminal apparatus 200 according to Embodiment 1 of the present disclosure. In FIG. 4, terminal apparatus 200 is provided with RF reception section 201, demodulation section 202, decoding section 203, frequency assigning parameter setting section 204, scheduling information setting section 205, encoding section 206, modulation section 207, DFT section 208, mapping section 209, IDFT section 210, and RF transmission section 211.

RF reception section 201 performs reception processing, such as down-conversion and A/D conversion, on a signal received via an antenna, and outputs the reception-processed signal to demodulation section 202.

Demodulation section 202 performs equalization processing and demodulation processing on the signal received from RF reception section 201, and outputs the signal thus processed to decoding section 203.

Decoding section 203 performs decoding processing on the signal received from demodulation section 202 and extracts control data including reception data and frequency scheduling information.

Encoding section 206 encodes transmission data and outputs the obtained encoded data to modulation section 207.

Modulation section 207 modulates the encoded data received from encoding section 206 and outputs the data-modulated signal to DFT section 208.

DFT section 208 performs DFT processing on the data-modulated signal received from modulation section 207 and outputs the obtained frequency domain data signal to mapping section 209.

Mapping section 209 maps the data signal received from DFT section 208 to a frequency domain resource according to the frequency assignment information received from scheduling information setting section 205, and outputs the obtained signal to IDFT section 210.

Frequency assigning parameter setting section 204 extracts information about the number of clusters contained in the control data received from decoding section 203. Further, frequency assigning parameter setting section 204 maintains a table showing correspondence that is similar to the table maintained in frequency assigning parameter setting section 112 in base station apparatus 100. Then, frequency assigning parameter setting section 204 outputs a frequency assignment unit corresponding to the number of clusters indicated by the extracted information about the number of clusters, to scheduling information setting section 205.

Scheduling information setting section 205 extracts the frequency assignment information contained in the control data received from decoding section 203. Then, scheduling information setting section 205 determines frequency scheduling information for terminal apparatus 200 based on the extract frequency assignment information and the frequency assignment unit received from frequency assigning parameter setting section 204. Specifically, scheduling information setting section 205 reads the frequency assignment information reported from base station apparatus 100, per frequency assignment unit received from frequency assigning parameter setting section 204, and determines whether or not the information is the actual frequency assignment information to be used by terminal apparatus 200. Then, scheduling information setting section 205 outputs the frequency assignment information for terminal apparatus 200 to mapping section 209.

IDFT section 210 performs IDFT processing on the signal received from mapping section 209. Then, IDFT section 210 outputs the signal obtained by IDFT processing to RF transmission section 211.

RF transmission section 211 performs transmission processing, such as D/A conversion, up-conversion, and amplification, on the signal received from IDFT section 210, and transmits the obtained radio signal to base station apparatus 100 via the antenna.

Then, information about the relationship between the number of clusters and the frequency assignment unit that are applied to a terminal to which frequency is assigned, which is maintained in frequency assigning parameter setting section 112, will be described below.

FIG. 5 shows an example of a table showing correspondence of a plurality of numbers of clusters and frequency assignment units corresponding to each number of clusters. In FIG. 5, the upper limit value of the number of clusters is 4. Further, the number of clusters of 1 is excluded because the number indicates contiguous frequency transmission. Further, the number of bits of frequency assignment information (i.e., the number of bits forming a frequency assigning bit sequence) is constant regardless of the number of clusters.

Figure 6:
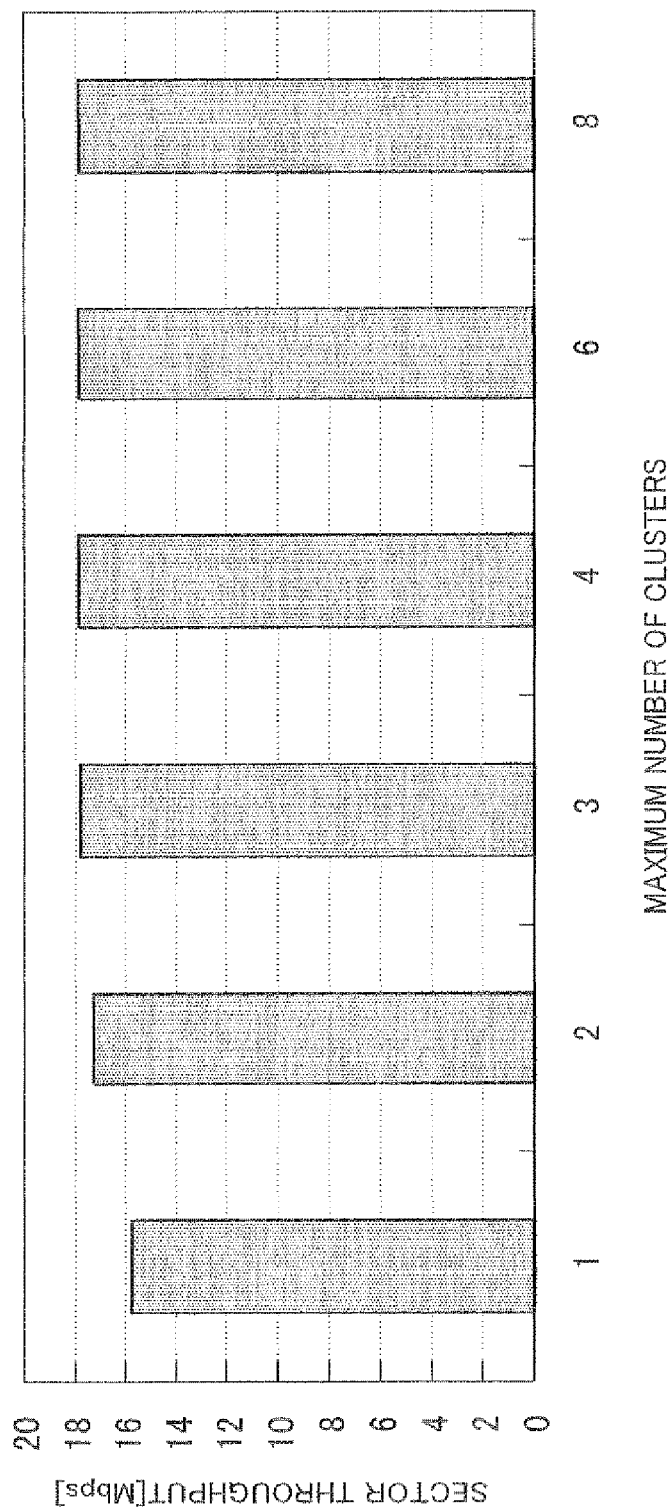
FIG. 6 shows a relationship between the maximum number of clusters that can be transmitted by a terminal apparatus and the average sector throughput.

Here, the upper limit value of the number of clusters is set based on the relationship between the number of clusters and system throughput performance. FIG. 6 shows the relationship between the maximum number of clusters that can be transmitted by a terminal apparatus and the average sector throughput (see Non-Patent Literature 3). FIG. 6 shows that system throughput performance does not deteriorate even when the number of clusters is limited to around 3 to 4. This is because the probability that the number of clusters of a terminal becomes 4 or greater is low. As described above, because the influence on system throughput performance is small, it is possible to set the upper limit value to the number of clusters.

Further, a frequency assignment unit corresponding to each number of clusters is determined as described below. First, a reference number of clusters, which constitutes a standard, is determined. As a reference number of clusters, the number of clusters that is most frequently used is selected, for example. Then, when the reference number of clusters is selected, the number of signaling bits that is required to report frequency resource assignment information is set as the reference number of bits. Then, for the number of clusters apart from the reference number of clusters, the frequency assignment unit having the closest number of signaling bits to the reference number of bits is selected, the number of signaling bits being required to report frequency resource assignment information using that number of clusters.

Figure 7:
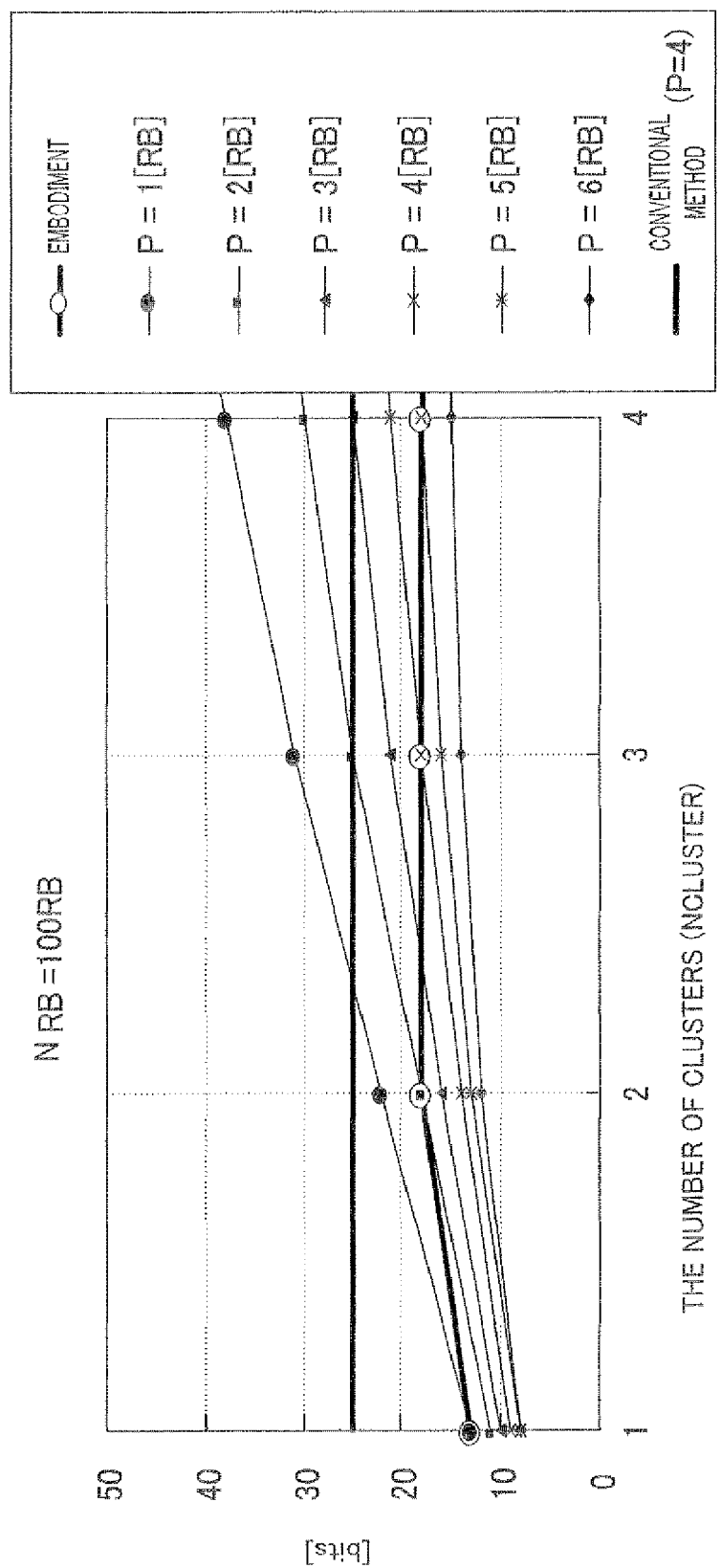
FIG. 7 shows a method of determining a frequency assignment unit corresponding to each number of clusters.

FIG. 7 shows a method of determining a frequency assignment unit corresponding to each number of clusters. Each point in FIG. 7 is plotted based on equation 3 below.

[3]

$$\text{The number of signaling bits} = \lceil \log_2(\lceil N_{RB}/P \rceil_{+1} C_{2N_{Cluster}}) \rceil \text{ [bits]} \quad \text{(Equation 3)}$$

where a system bandwidth is expressed $N_{RB}$ [RB], the number of clusters is expressed as $N_{Cluster}$, and a frequency assignment unit is expressed as P [RB].

FIG. 7 shows a graph of the relationship of the number of clusters and the number of signaling bits when $N_{RB}$=100 [RB] is satisfied. Assuming that the number of signaling bits of 18 [bits], in the case of the number of clusters of 2 and P=2 [RB], is set as the reference number of bits, a frequency assignment unit of 4 having the closest number of signaling bits to the reference number of bits 18 is selected when the number of clusters is 3, and, similarly, a frequency assignment unit of 5 is selected when the number of clusters is 4.

FIG. 7 shows the number of signaling bits when the above-described conventional technique is used, in which the number of signaling bits is fixed (the number of signaling bits is 25 bits in the case of P=4) regardless of the number of clusters. As is clear from FIG. 7, by limiting the maximum number of clusters to 4 according to the present embodiment, it is possible to reduce the number of signaling bits compared to the conventional technique.

Further, by making the numbers of signaling bits the same for each number of clusters, it is possible to use one signaling format regardless of the number of clusters. By this means, terminal apparatus 200 can reduce the number of blind decoding processing for detecting a signaling format.

As described above, according to the present embodiment, in base station apparatus 100, scheduling section 113 assigns a frequency resource to a terminal to which frequency is assigned, based on the set frequency assignment unit, and frequency assigning parameter setting section 112 adjusts a frequency assignment unit to set to scheduling section 113 based on the number of clusters to be applied to the terminal to which frequency is assigned.

By doing so, it is possible to perform assignment of a frequency resource based on the frequency assignment unit optimized with respect to the number of signaling bits for each number of clusters. As a result of this, it is possible to reduce the amount of signaling for frequency resource assignment information. Further, by setting the number of clusters, which is a parameter having little influence on system throughput, as a setting parameter of the frequency assignment unit, it is possible to maintain the system throughput.

Further, the number of bits forming a frequency assigning bit sequence is constant regardless of the number of clusters.

By doing so, it is possible to report frequency resource assignment information using a common signaling format regardless of the number of clusters. By this means, it is possible to reduce the number of blind decoding processing for detecting a signaling format at a side receiving scheduling information.

A case has been described with the above description where the number of bits forming a frequency assigning bit sequence is constant regardless of the number of clusters. However, the number of bits forming a frequency assigning bit sequence can vary depending on the number of clusters. In such a case, encoding section 114 makes the total number of bits constant regardless of the number of clusters by adding padding bits (for example, a bit value of 0) before encoding a frequency assigning bit sequence. For example, as shown in FIG. 8, when determining the frequency assignment units and the numbers of signaling bits for the numbers of clusters of 3 and 4 by setting the number of signaling bits (=22 [bits]) in the case of the number of clusters of 2 as the reference number of bits, the numbers of signaling bits required for reporting frequency assignment information are not equal. In this case, because encoding section 114 adds a padding bit to make the numbers of signaling bits equal, it is possible to share a signaling format, making it possible to reduce the number of blind decoding processing for detecting a signaling format at a side receiving scheduling information.

Embodiment 2

A case will be described here with Embodiment 2 where, as a parameter to determine a frequency assignment unit, a "system bandwidth" is adopted in addition to the number of clusters.

Figure 9:
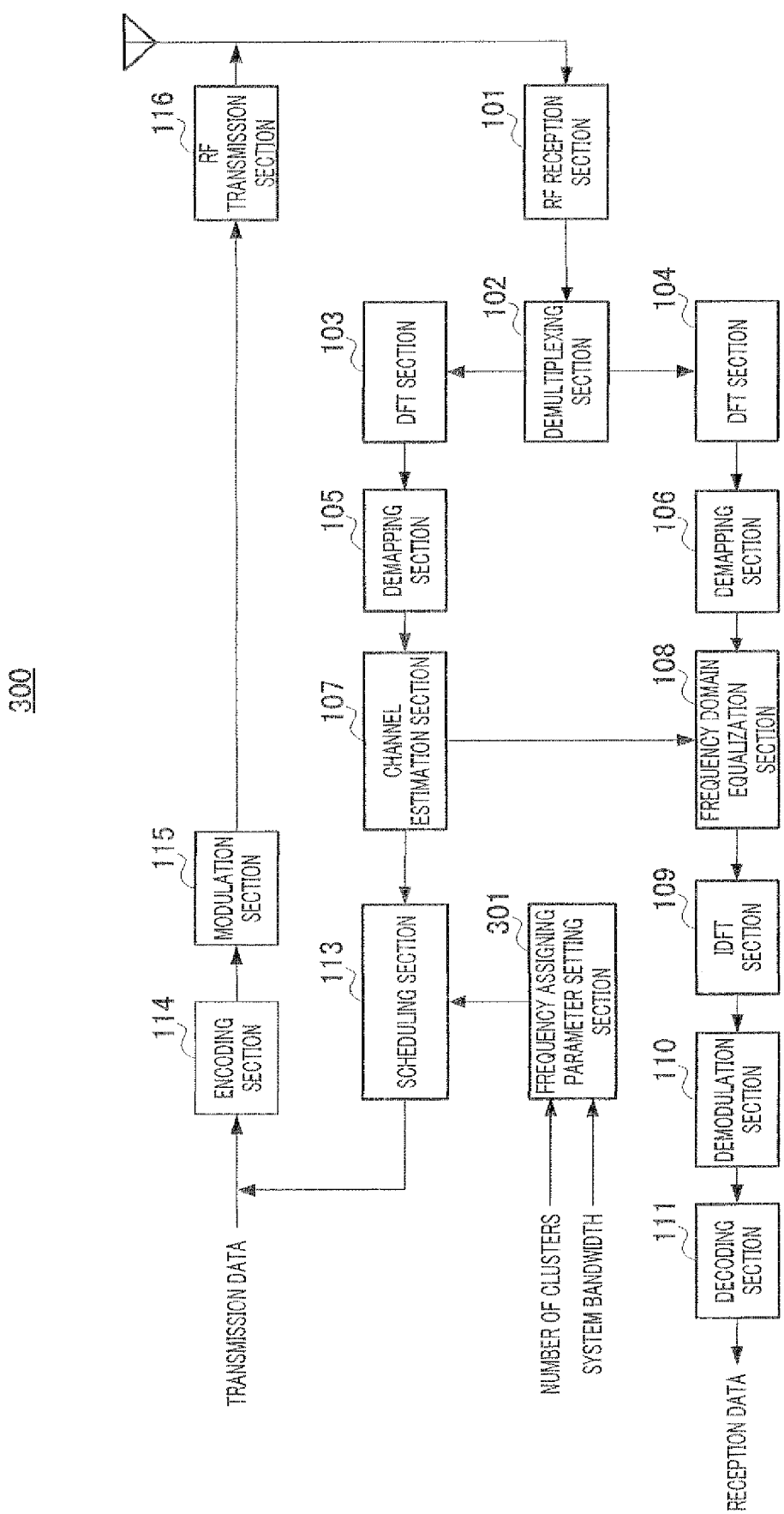
FIG. 9 is a block diagram showing a configuration of a base station apparatus according to Embodiment 2 of the present invention.

FIG. 9 is a block diagram showing a configuration of base station apparatus 300 according to Embodiment 2 of the present disclosure. In FIG. 9, base station apparatus 300 is provided with frequency assigning parameter setting section 301.

Frequency assigning parameter setting section 301 maintains information about the relationship between the number of clusters and the frequency assignment unit that are applied to a terminal to which frequency is assigned, per system bandwidth. Frequency assigning parameter setting section 301 has, for example, a second table showing correspondence shown in FIG. 10 in addition to the first table showing correspondence shown in FIG. 5. The system bandwidths to be used for the first table showing correspondence and the second table showing correspondence are different. Here, the term "system bandwidth" refers to a bandwidth of the whole band that base station apparatus 300 can receive, that is, a bandwidth of the whole band that can be assigned to terminals in the cell covered by base station apparatus 300.

Then, in the table showing correspondence corresponding to the system bandwidth to be input, frequency assigning parameter setting section 301 sets a frequency assignment unit according to the number of clusters indicated by the information about the number of clusters to be input, to scheduling section 113. Frequency assigning parameter setting section 301, for example, uses the first table showing correspondence shown in FIG. 5 when the system bandwidth is 100 [RB], and uses the second table showing correspondence shown in FIG. 10 when the system bandwidth is 200 [RB]. That is, frequency assigning parameter setting section 301 switches tables showing correspondence to be used depending on the system bandwidth.

Here, when the system bandwidth varies, usage rate per number of clusters of a terminal apparatus in the system changes. For example, because the amount of frequency resource that can be used by one terminal apparatus changes as the system bandwidth is broadened, it is necessary to assign larger number of clusters to a terminal apparatus to improve throughput performance.

Therefore, frequency assigning parameter setting section 301 switches tables showing correspondence to be used depending on the system bandwidth, so that it is possible to use the optimal table showing correspondence according to the system bandwidth.

Figure 11:
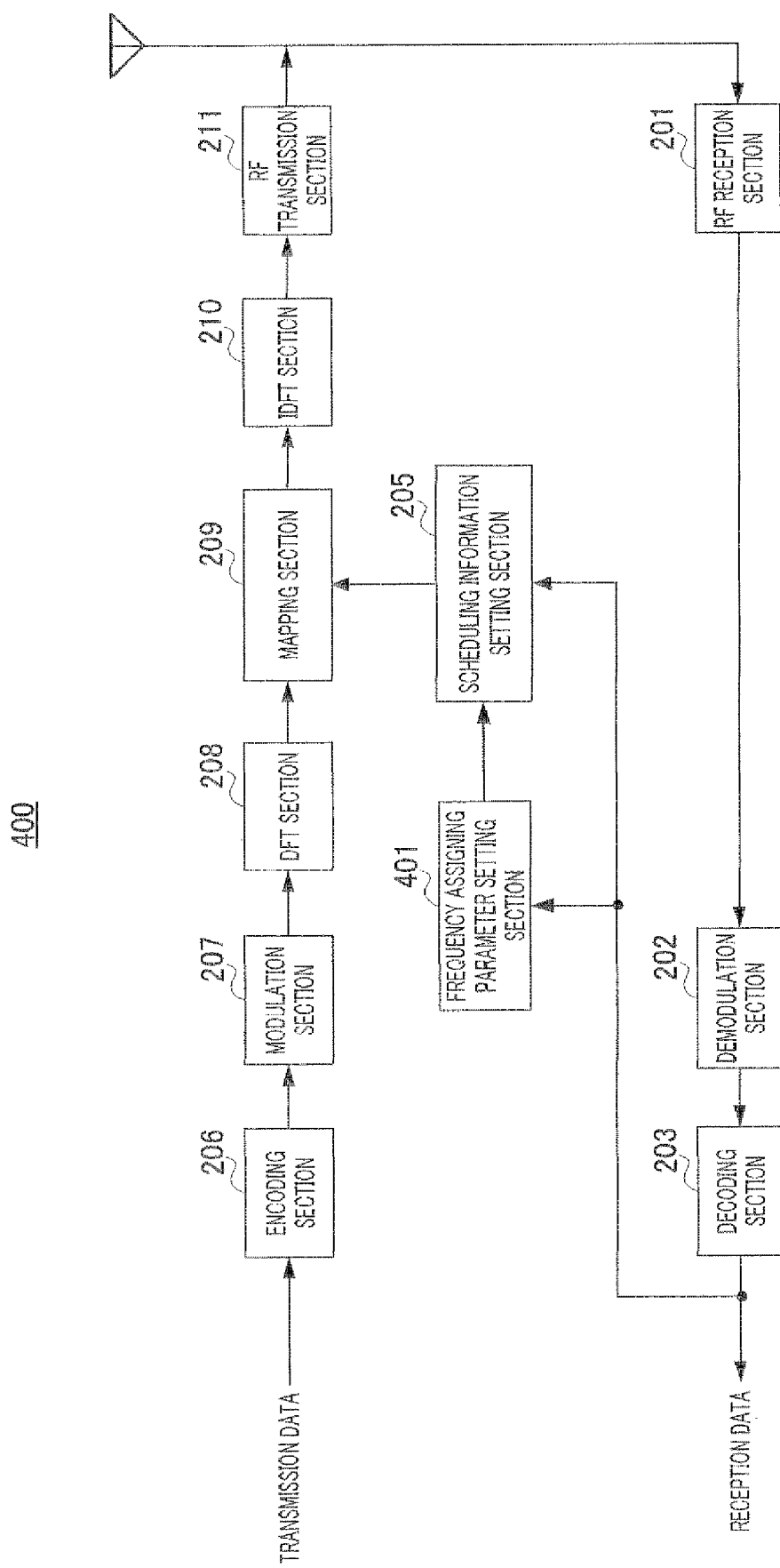
FIG. 11 is a block diagram showing a configuration of a terminal apparatus according to Embodiment 2 of the present invention.

FIG. 11 is a block diagram showing a configuration of terminal apparatus 400 according to Embodiment 2 of the present disclosure. In FIG. 11, terminal apparatus 400 is provided with frequency assigning parameter setting section 401.

Frequency assigning parameter setting section 401 extracts information about the number of clusters and information about a system bandwidth that are contained in the control data received from decoding section 203. Further, frequency assigning parameter setting section 401 maintains a table showing correspondence that is similar to the table maintained in frequency assigning parameter setting section 301 of base station apparatus 300. Then, frequency assigning parameter setting section 401 outputs a frequency assignment unit corresponding to the system bandwidth indicated by the extracted information about a system bandwidth and the number of clusters indicated by the information about the number of clusters, to scheduling information setting section 205.

As described above, according to the present embodiment, in base station apparatus 300, frequency assigning parameter setting section 301 adjusts the frequency assignment unit to be set based on the bandwidth of the system band in addition to the number of clusters.

By doing so, it is possible to use the optimum relationship between the number of clusters and the frequency assignment unit corresponding to the system bandwidth, making it possible to improve system throughput performance.

Embodiment 3

A case will be described here with Embodiment 3 where, when the number of bits forming a frequency assigning bit sequence varies depending on the number of clusters, offset information for fine-tuning the frequency assignment position is added, without padding "0" bits.

Figure 12:
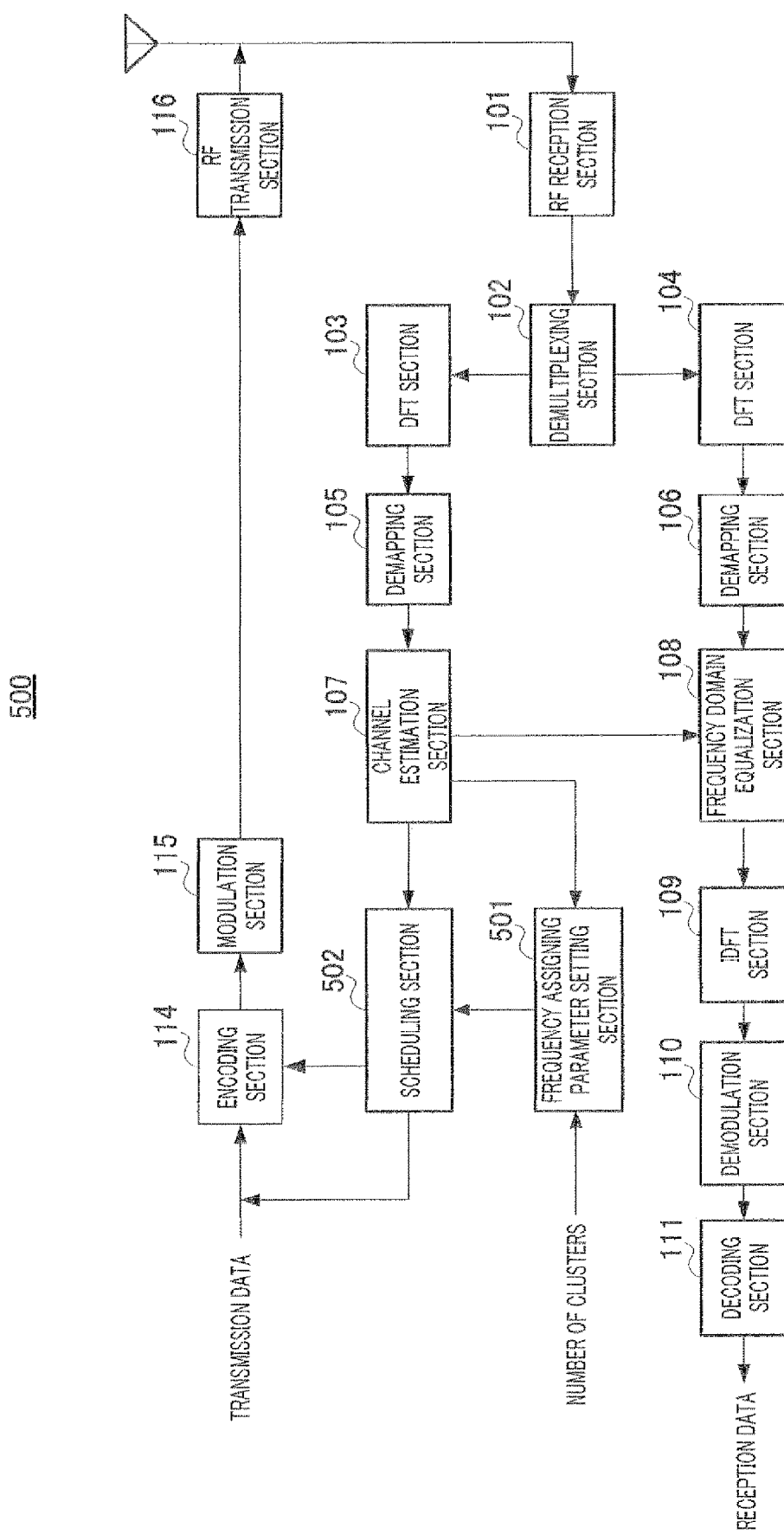
FIG. 12 is a block diagram showing a configuration of a base station apparatus according to Embodiment 3 of the present invention.

FIG. 12 is a block diagram showing a configuration of base station apparatus 500 according to Embodiment 3 of the present disclosure. In FIG. 12, base station apparatus 500 is provided with frequency assigning parameter setting section 501 and scheduling section 502.

Frequency assigning parameter setting section 501 determines whether or not to shift the frequency resource assigned in scheduling section 502, in a direction of frequency, based on the channel estimation value received from channel estimation section 107. The standard for deciding whether or not to perform shifting is based on the channel quality in the RB to be assigned. For example, the RB to be assigned having a higher average SINR is selected by calculating average SINRs in the RBs to be assigned for the cases where shifting is performed and not performed. By this means, because it is possible to assign the RB having a higher channel quality to a terminal, it is possible to improve system throughput performance.

Figure 13:
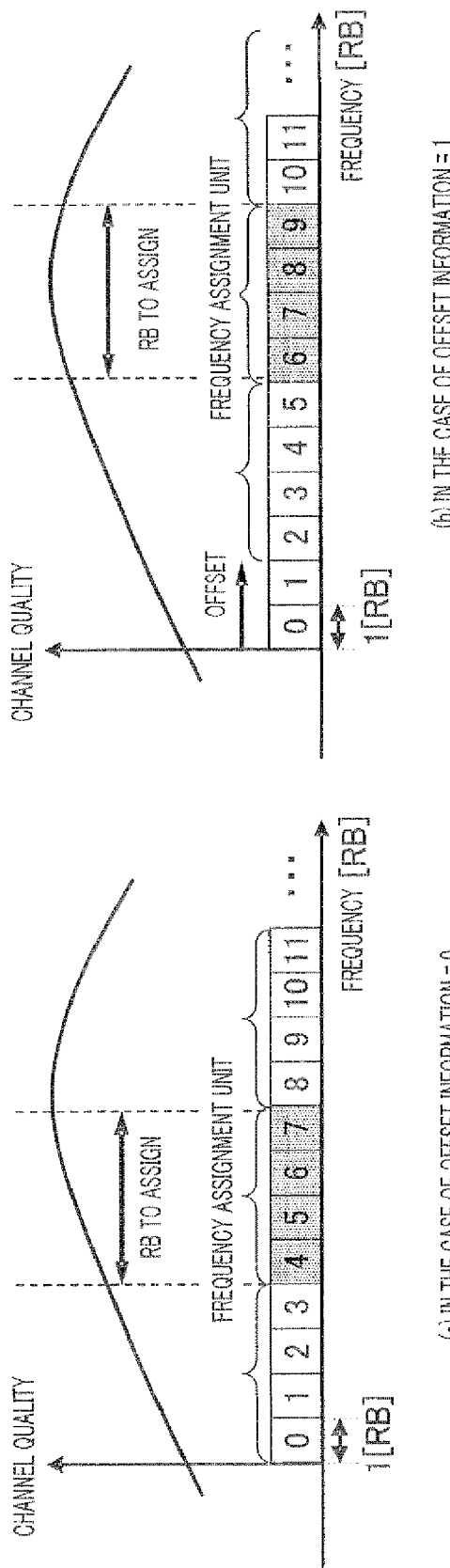
FIG. 13 shows offset information for tune-adjusting a frequency assignment position.

Scheduling section 502 forms a frequency assigning bit sequence as scheduling section 113 does. Further, scheduling section 502 adds offset information to a frequency assigning bit sequence according to the result of determination in frequency assigning parameter setting section 501. For example, as shown in FIG. 13, the bit value of 0 is set as offset information when determination not to perform shifting is made, while the bit value of 1 is set as offset information when shifting is performed. An example of a table showing correspondence in this case is shown in FIG. 14.

As described above, according to the present disclosure, in base station apparatus 500, frequency assigning parameter setting section 501 determines whether or not to shift the frequency resource assigned in scheduling section 502, in a direction of frequency, based on the channel estimation value, and scheduling section 502 adds offset information to a frequency assigning bit sequence corresponding to the result of determination in frequency assigning parameter setting section 501.

By doing so, the flexibility in frequency scheduling increases, so that it is possible to accurately assign frequency resources having good channel quality, making it possible to improve system throughput performance.

Other Embodiment (1) In the above embodiments, it is possible to switch methods of reporting frequency scheduling information according to the number of clusters between either method of Embodiments 1 to 3 and a conventional method (i.e., a method of reporting in the bitmap format). For example, as shown in FIG. 15, it is possible to apply either method of Embodiments 1 to 3 when the number of clusters is 4 or smaller, and to apply the conventional method when the number of clusters is 5 or greater.

(2) In the above embodiments, when the number of clusters to report is not a power of 2, it is possible to report identification information using a pattern combining the number of clusters and frequency assignment information. For example, as shown in FIG. 16, by reporting identification information using the pattern combining the number of clusters and frequency assignment information, it is possible to reduce the number of the overall signaling bits for the number of clusters and frequency assignment information. Comparison of FIG. 16 with FIG. 8 shows that, in the case of the number of clusters of 3, it is possible to reduce the overall signaling bits for the number of clusters and frequency assigning information by one bit. By assigning this reduced number of bits to offset information, it is possible to increase the flexibility in frequency scheduling, making it possible to improve system performance.

(3) Although cases have been described with the above embodiments where the case of the number of clusters of 1 is excluded, it is possible to include the number of clusters of 1 (contiguous frequency assignment). For example, as shown in FIG. 17, by sharing a common signaling format in both contiguous frequency assignment and non-contiguous frequency assignment, it is possible to reduce the number of blind decoding processing for detecting a signaling format at a side receiving scheduling information.

(4) Also, although cases have been described with the above embodiments as examples where the present disclosure is configured by hardware, the present disclosure can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-035617, filed on Feb. 18, 2009, including the specification, drawings and abstract, is incorporated herein by reference in its entirety.

INDUSTRIAL APPLICABILITY

A scheduling apparatus and a scheduling method according to the present disclosure is useful for maintaining system throughput performance and reducing the amount of signaling for frequency resource assignment information.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit which, in operation, controls a process of a communication apparatus, the process comprising:
    receiving resource allocation control information relating to a number of clusters allocated to the communication apparatus, wherein the clusters are frequency resources located on different positions on a frequency axis, and each cluster includes one or more resource block groups of a resource block group size wherein the resource block group size is a number of resource blocks included in one resource block group; and
    based on the number of clusters and a system bandwidth, determining the resource block group size.

2. The integrated circuit according to claim 1, wherein a common signaling format is used for both continuous frequency resource allocation where the number of clusters is one, and non-continuous frequency resource allocation where the number of clusters is two or more.

3. The integrated circuit according to claim 2, wherein the common signaling format includes a type bit indicative of the number of clusters and allocation information indicative of frequency resource allocation.

4. The integrated circuit according to claim 3, wherein the allocation information has N bits calculated according to the following equation:

$$N = \lceil \log_2((\lceil N_{RB}/P \rceil + 1)C(2N_{Cluster})) \rceil$$

wherein, $N_{RB}$ is the system bandwidth, P is the resource block group size, $N_{Cluster}$ is the number of clusters, and C means a number of combinations of selecting $2*N_{Cluster}$ cluster starting and ending positions out of $\lceil N_{RB}/P \rceil + 1$ number of possible cluster starting and ending positions, and $\lceil \ \rceil$ represents a ceiling function.

5. The integrated circuit according to claim 3, wherein the type bit is indicative of a restricted number of clusters.

6. The integrated circuit according to claim 1, wherein a total number of bits in a signaling format used for continuous frequency resource allocation where the number of clusters is one is equal to a total number of bits in a signaling format used for non-continuous frequency resource allocation where the number of clusters is two or more.

7. The integrated circuit according to claim 1, wherein the resource block group size takes a larger number as the number of clusters grows larger.

8. A communication apparatus, comprising:
a receiver, which, in operation, receives resource allocation control information relating to a number of clusters allocated to the communication apparatus, wherein the clusters are frequency resources located on different positions on a frequency axis, and each cluster includes one or more resource block groups of a resource block group size wherein the resource block group size is a number of resource blocks included in one resource block group; and
circuitry, which is coupled to the receiver and which, in operation, based on the number of clusters and a system bandwidth, determines the resource block group size.

9. The communication apparatus according to claim 8, wherein a common signaling format is used for both continuous frequency resource allocation where the number of clusters is one, and non-continuous frequency resource allocation where the number of clusters is two or more.

10. The communication apparatus according to claim 9, wherein the common signaling format includes a type bit indicative of the number of clusters and allocation information indicative of frequency resource allocation.

11. The communication apparatus according to claim 10, wherein the allocation information has N bits calculated according to the following equation:

$$N=\lceil \log_2((\lceil N_{RB}/P \rceil+1)C(2N_{Cluster})) \rceil$$

wherein, $N_{RB}$ is the system bandwidth, P is the resource block group size, $N_{Cluster}$ is the number of clusters, and C means a number of combinations of selecting $2*N_{Cluster}$ cluster starting and ending positions out of $\lceil N_{RB}/P \rceil+1$ number of possible cluster starting and ending positions, and $\lceil \ \rceil$ represents a ceiling function.

12. The communication apparatus according to claim 10, wherein the type bit is indicative of a restricted number of clusters.

13. The communication apparatus according to claim 8, wherein a total number of bits in a signaling format used for continuous frequency resource allocation where the number of clusters is one is equal to a total number of bits in a signaling format used for non-continuous frequency resource allocation where the number of clusters is two or more.

14. The communication apparatus according to claim 8, wherein the resource block group size takes a larger number as the number of clusters grows larger.

15. A method implemented by a communication apparatus, the method comprising:
receiving resource allocation control information relating to a number of clusters allocated to the communication apparatus, wherein the clusters are frequency resources located on different positions on a frequency axis, and each cluster includes one or more resource block groups of a resource block group size wherein the resource block group size is a number of resource blocks included in one resource block group; and
based on the number of clusters and a system bandwidth, determining the resource block group size.

16. The method according to claim 15, wherein a common signaling format is used for both continuous frequency resource allocation where the number of clusters is one, and non-continuous frequency resource allocation where the number of clusters is two or more.

17. The method according to claim 16, wherein the common signaling format includes a type bit indicative of the number of clusters and allocation information indicative of frequency resource allocation.

18. The method according to claim 17, wherein the allocation information has N bits calculated according to the following equation:

$$N=\lceil \log_2((\lceil N_{RB}/P \rceil+1)C(2N_{Cluster})) \rceil$$

wherein, $N_{RB}$ is the system bandwidth, P is the resource block group size, $N_{Cluster}$ is the number of clusters, and C means a number of combinations of selecting $2*N_{Cluster}$ cluster starting and ending positions out of $\lceil N_{RB}/P \rceil+1$ number of possible cluster starting and ending positions, and $\lceil \ \rceil$ represents a ceiling function.

19. The method according to claim 15, wherein a total number of bits in a signaling format used for continuous frequency resource allocation where the number of clusters is one is equal to a total number of bits in a signaling format used for non-continuous frequency resource allocation where the number of clusters is two or more.

20. The method according to claim 15, wherein the resource block group size takes a larger number as the number of clusters grows larger.

* * * * *